(12) United States Patent
Fraij et al.

(10) Patent No.: US 8,794,128 B2
(45) Date of Patent: Aug. 5, 2014

(54) DEVICE FOR FROTHING MILK, COMPRISING MEANS FOR PREVENTING BLOCKAGE OF AN AIR RESTRICTION BY MILK RESIDUE

(75) Inventors: Fred Fraij, Hoogeveen (NL); Joeke Noordhuis, Groningen (NL); Peter Rijskamp, Fluitenberg (NL); Yde Johannes Venema, Groningen (NL); Gert Westrup, Sint Jansklooster (NL); Roel Steunenbeg, Groningen (NL)

(73) Assignee: Koninklijke Philips N.V., Eindhoven (NL)

( * ) Notice: Subject to any disclaimer, the term of this patent is extended or adjusted under 35 U.S.C. 154(b) by 449 days.

(21) Appl. No.: 13/059,543

(22) PCT Filed: Aug. 25, 2009

(86) PCT No.: PCT/IB2009/053722
§ 371 (c)(1),
(2), (4) Date: Feb. 17, 2011

(87) PCT Pub. No.: WO2010/023617
PCT Pub. Date: Mar. 4, 2010

(65) Prior Publication Data
US 2011/0139012 A1  Jun. 16, 2011

(30) Foreign Application Priority Data
Aug. 25, 2008 (EP) .................................... 08162896

(51) Int. Cl.
*A47J 31/44*  (2006.01)

(52) U.S. Cl.
USPC ............................................ 99/323.1; 99/290

(58) Field of Classification Search
USPC ........................................ 99/323.1, 275, 453
See application file for complete search history.

(56) References Cited

U.S. PATENT DOCUMENTS

| | | | |
|---|---|---|---|
| 4,620,953 A | 11/1986 | Silla et al. | |
| 4,715,274 A | 12/1987 | Paoletti | |
| 4,779,519 A | 10/1988 | Giuliano | |
| 5,265,520 A | 11/1993 | Giuliano | |
| 5,738,002 A * | 4/1998 | Marano-Ducarne | 99/293 |
| 5,768,981 A | 6/1998 | Cicchetti | |
| 7,040,600 B2 * | 5/2006 | Lutzer | 251/250 |
| 7,069,843 B2 * | 7/2006 | Paoletti | 99/453 |
| 7,316,178 B2 | 1/2008 | Halliday et al. | |
| 2008/0095904 A1 | 4/2008 | Sullivan et al. | |

FOREIGN PATENT DOCUMENTS

| | | |
|---|---|---|
| EP | 0326929 A1 | 8/1989 |
| WO | 03043472 A1 | 5/2003 |
| WO | 2008050366 A1 | 5/2008 |

* cited by examiner

*Primary Examiner* — Jianying Atkisson

(57) ABSTRACT

A device for performing a process of treating a liquid including a detachably arranged liquid treating unit and a basic part which is suitable for receiving and accommodating the liquid treating unit. The liquid treating unit has an air restriction for taking in air to be used in the liquid treating processes, wherein the air restriction includes a pin and a hole for receiving the pin. The pin is rotatably arranged in the hole, and means are provided for causing a rotation of the pin in case of a movement of the liquid treating unit relative to the liquid treating device.

12 Claims, 3 Drawing Sheets

DEVICE FOR FROTHING MILK, COMPRISING MEANS FOR PREVENTING BLOCKAGE OF AN AIR RESTRICTION BY MILK RESIDUE

FIELD OF THE INVENTION

The present invention relates to a device for performing a process of treating a liquid such as milk during which air is supplied to the liquid, comprising a detachably arranged liquid treating unit and a basic part which is suitable for receiving and accommodating the liquid treating unit, wherein the liquid treating unit has an air restriction for taking in air to be used in the liquid treating processes, wherein the air restriction comprises a pin and a hole for receiving the pin.

BACKGROUND OF THE INVENTION

In general, a process of frothing milk involves mixing the milk with air, so that air bubbles are formed in the milk, and a foamy milk substance is obtained. In view of this fact, a device for frothing milk needs to be adapted to take in air and supply the air to a quantity of milk. In many cases, for the purpose of taking in air, the milk frothing device has an air restriction, which may be a suitable orifice, for example. However, one of the main difficulties in milk frothing devices is ensuring that the air restriction is reliable, wherein the air restriction should not vary in time, and should not suffer from cleaning issues.

According to one possibility, the air restriction may be arranged such as to be separated from the environment of the milk frothing device, and to be connected to a frothing geometry by suitable transport means. In that case, a difficulty resides in the fact that milk has to be removed from the transport means once it enters there, which may happen under the influence of pressures prevailing in the frothing geometry, for example.

According to another possibility, the air restriction is located in the direct vicinity of a frothing geometry, wherein there is no need for transport means. In that case, the air restriction may be embodied as a combination of a pin and a hole, wherein the pin has a flat side, and wherein the pin is inserted in the hole. For cleaning purposes, the pin may be removed from the hole. Hence, cleaning is a rather easy task, since no small holes or channels that are difficult to reach are involved.

U.S. Pat. No. 4,715,274 discloses an emulsifier unit for application to coffee making machines. The emulsifier unit comprises a suction chamber whereto a milk intake duct and an air intake duct are led. In order to control a working cross-sectional area for the air flow, the emulsifier unit further comprises a pin having a facet formation insertable into the air intake conduit. U.S. Pat. No. 4,715,274 teaches that with this arrangement, it becomes possible to provide the air intake conduit with a relatively large cross-sectional area, whereby this conduit can be easily and quickly cleaned to prevent stagnation of any fat particles or the like. Furthermore, U.S. Pat. No. 4,715,274 teaches that the pin may be used to change the working cross-sectional flow area by merely turning it.

Still, a problem of the use of the pin-and-hole air restriction in a milk frothing device is that blockage may occur during operation by a gelation process of milk that is drawn in by capillary forces. The pin is in constant contact with milk, and once the milk dries in, it starts to form a milk-gel, whereby the restriction may be completely blocked.

SUMMARY OF THE INVENTION

It is an object of the present invention to provide a solution to the above-mentioned problem of blockage of a pin-and-hole air restriction in a milk frothing device during operation of the device. The object is achieved by a device as mentioned in the opening paragraph, i.e. a device comprising a liquid treating unit and a basic part, and a pin-and-hole air restriction in the liquid treating unit, wherein the pin is rotatably arranged in the hole, and wherein means are provided for causing a rotation of the pin in case of a movement of the liquid treating unit with respect to the basic part during which the liquid treating unit is removed from the basic part and/or a movement of the liquid treating unit with respect to the basic part during which the liquid treating unit is put in an operation position in the basic part.

The present invention is based on the insight that by rotating the pin in the hole, any blockage of liquid residue inside the air restriction is destroyed, as the movement of the pin with respect to a wall delimiting the hole breaks adherences of the liquid residue to surface areas of the pin and/or the wall of the hole. On the basis of the presence of means for causing a rotation of the pin when the liquid treating unit is removed from the basic part and/or put in an operational position in the basic part, an automated rotation mechanism is realized, and opening of a blocked restriction is achieved every time the mechanism is activated. As the activation of the rotation mechanism automatically takes place when the liquid treating unit is removed from the basic part and/or when the liquid treating unit is put in an operation position in the basic part, it is ensured that the blockage destroying process takes place at a frequency that is sufficiently high to avoid any problems in the air intake process. In practical cases, it may even be so that the liquid treating unit has a container which is only suitable for containing a limited number of quantities of liquid, such as one or two, so that frequent removal of the liquid treating unit for filling purposes is guaranteed. Therefore, in such cases, it is ensured that the blockage destroying process is performed at least once per a limited number of liquid treating processes. Furthermore, it is a general advantage of automated mechanisms that their functioning is independent of mindfulness of humans.

Within the scope of the present invention, the pin rotating means may be embodied in any suitable way. For example, these means may comprise both at least one element which is arranged on the basic part and at least one element which is arranged on the pin, wherein the elements as mentioned are adapted to be in moving engagement with each other in case of a movement of the liquid treating unit with respect to the basic part during which the liquid treating unit is removed from the basic part and/or a movement of the liquid treating unit with respect to the basic part during which the liquid treating unit is put in an operational position in the basic part. In particular, the basic part may be provided with a toothed rack, and the pin may be provided with a gear which is suitable for engagement with said toothed rack. It may be enough for the toothed rack to comprise only a single tooth. In general, it is noted that the pin does not need to make a complete turn, i.e. a turn over 360°, for realizing an effective blockage destroying process.

The above-described and other aspects of the present invention will be apparent from and elucidated with reference to the following description of a beverage maker according to the present invention.

BRIEF DESCRIPTION OF THE DRAWINGS

The present invention will now be explained in greater detail with reference to the figures, in which equal or similar elements are indicated by the same reference signs, and in which.

DETAILED DESCRIPTION OF EMBODIMENTS

Figure 1:
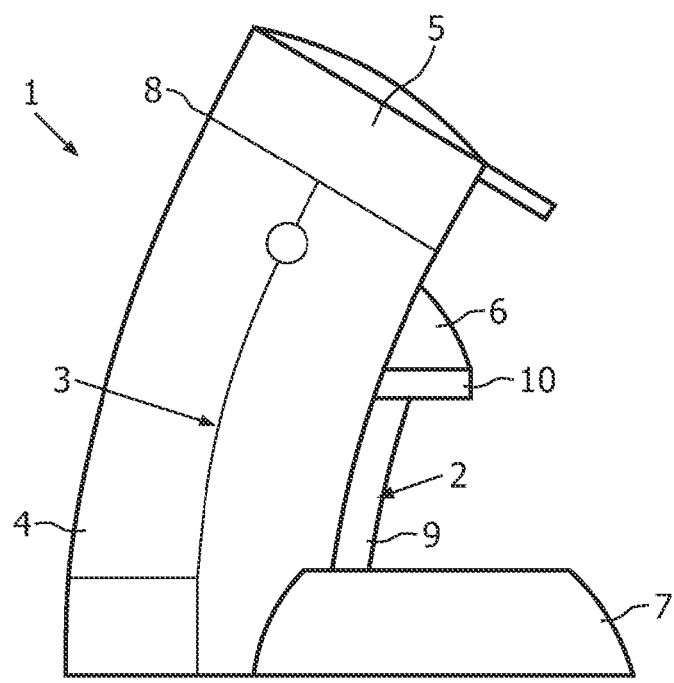
FIG. 1 diagrammatically shows a side view of a beverage maker according to the present invention.

FIG. 1 shows a beverage maker 1 according to the present invention. For example, the beverage maker 1 may be particularly suitable for making coffee beverages on the basis of ground coffee beans and hot water. In any case, the beverage maker 1 comprises a milk frothing unit 2, which is suitable for making frothed milk. As processes of making coffee beverages and frothed milk are well-known, and the present invention is not directly aimed at altering the way in which these processes are being carried out, these processes will not be further elucidated here.

The milk frothing unit 2 is detachably arranged in the beverage maker 1, and the beverage maker 1 further comprises a basic part 3 which is suitable for receiving and holding the milk frothing unit 2, and which also serves for accommodating elements to be used in the process of making coffee beverages. In a manner known per se, the basic part 3 has a detachably arranged tank 4 for containing water to be used for making the coffee beverages, a lid 5 which is hingably arranged at a top side of the basic part 3, an outlet part 6 for letting out the beverages, and a drip tray 7 for receiving spilled quantities of beverage.

In FIG. 1, the lid 5 is shown in a closed position. The lid 5 may be put to an opened position by rotating it about a hinge 8. When the lid 5 is in the opened position, a portion of the inside of the beverage maker 1 is freely accessible, so that it is possible for a user of the beverage maker 1 to insert a suitable quantity of beverage extract such as ground coffee beans in the beverage maker 1 prior to activating the beverage maker 1 for performing a beverage making process, or to remove a used quantity of beverage extract after a beverage making process has taken place. For example, the beverage maker 1 may be especially adapted to receiving and accommodating pads containing a quantity of ground coffee beans, in a manner known per se.

The milk frothing unit 2 has a container 9 for containing milk and a member 10 for connection to the basic part 3. On the basis of the detachable arrangement of the milk frothing unit 2 in the beverage maker 1, it is possible for a user of the beverage maker 1 to remove the milk frothing unit 2 from the beverage maker 1 for filling and/or cleaning purposes.

Figure 2:
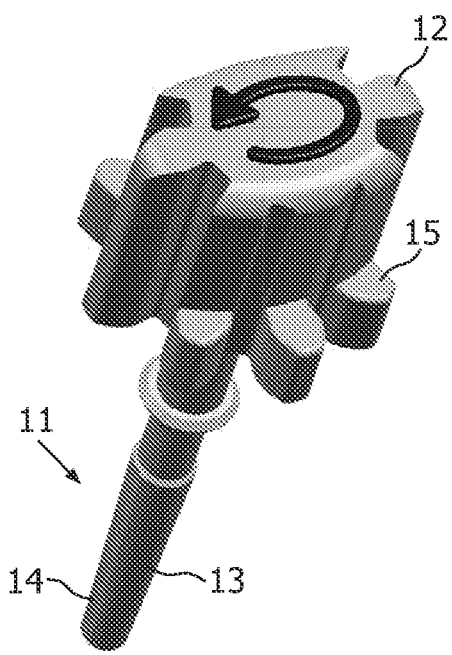
FIG. 2 shows a perspective view of a pin which is part of an air restriction of a milk frothing unit of the beverage maker.

At the location of the connection member 10, the milk frothing unit 2 comprises an air restriction (not shown) for letting in air to a quantity of milk to be frothed. In particular, the air restriction comprises a pin 11 and a hole which is suitable for accommodating the pin 11. An embodiment of the pin 11 according to the present invention is shown in FIG. 2. In general, the pin 11 has a head 12 and a body 13 extending from the head 12, wherein the body 13 has a flat side 14, and wherein the body 13 is the portion of the pin 11 that is actually intended to be inserted in the hole.

A disadvantage of the pin-and-hole air restriction is that milk is drawn in by capillary forces, as milk residue may cause blockage of the air restriction under the influence of a gelation process. According to the present invention, in order to solve this problem, the pin 11 is arranged inside the hole such as to be rotatable about its longitudinal axis, and a mechanism is provided for automatically causing a rotation of the pin 11 every time the milk frothing unit 2 is removed from the basic part 3 or put in an operational position in the basic part 3. By a rotation of the pin 11 inside the hole, it is achieved that any blockage is cancelled, and that any milk gel is destroyed. It is noted that it is not necessary to let the pin 11 make a complete turn in order to obtain the desired blockage destroying effect.

In the shown example, rotation of the pin 11 is realized through cooperation of a gear 15 and a toothed rack 16, wherein the gear 15 is arranged on the pin 11 at the location of the pin head 12, and wherein the toothed rack 16 is arranged on the basic part 3 at the location of the outlet part 6, which is also suitable for receiving frothed milk from the milk frothing unit 2 and letting out the frothed milk or a mixture of the frothed milk with a beverage that is prepared in the basic part 3. In FIGS. 3-6, the toothed rack 16 is shown, and it is clear from these figures that it is possible for the toothed rack 16 to have only one tooth 17. That does not alter the fact that it is also possible to have more teeth in the rack 16.

FIGS. 3-6 show a bottom view of the pin 11 and a portion of the basic part 3, and illustrate successive stages in a process of rotating the pin 11 when the milk frothing unit 2 is removed from the basic part 3. It is noted that for sake of clarity, no other elements of the milk frothing unit 2 than the pin 11 are shown in FIGS. 3-6.

Figure 3:
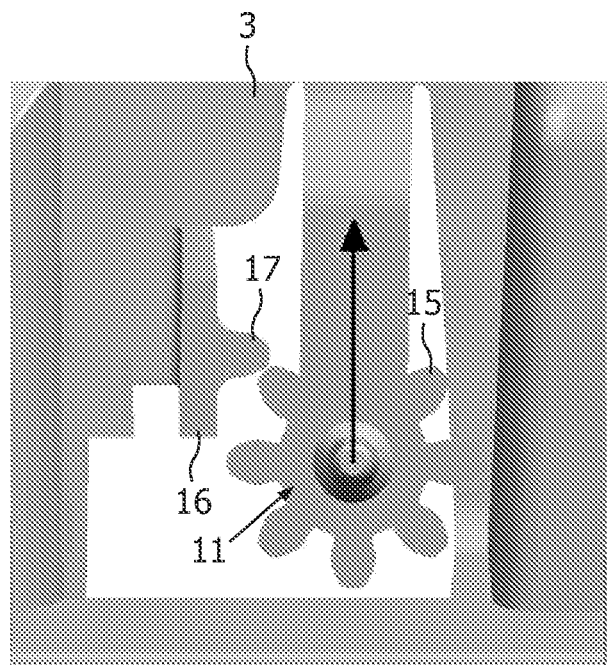
FIGS. 3-6 show a bottom view of the pin and a portion of a basic part of the beverage maker, and illustrate successive stages in a process of rotating the pin when the milk frothing unit is removed from the basic part.
Figure 6:
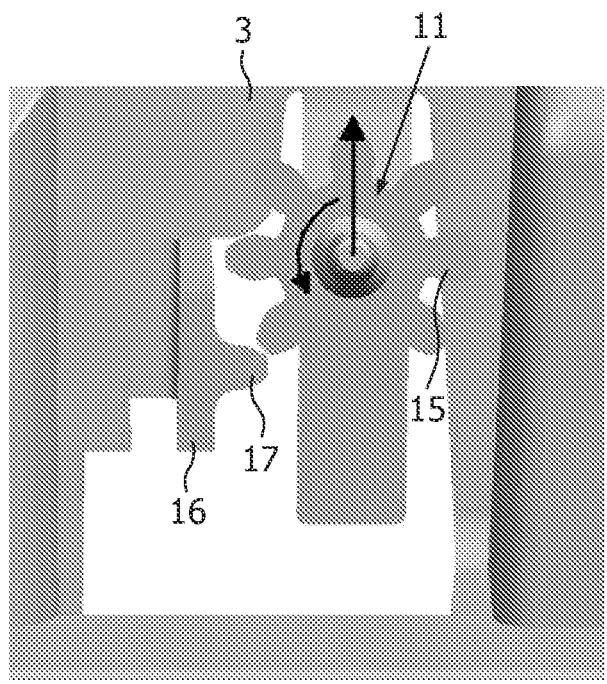

The position of the pin 11 in the basic part 3 as shown in FIG. 3 corresponds to a position of the milk frothing unit 2 in which the milk frothing unit 2 is in an operational position in the beverage maker 1, i.e. a position of the milk frothing unit 2 in which the milk frothing unit 2 may be operated to supply frothed milk. In FIGS. 3 and 6, a direction in which the milk frothing unit 2 is moved during its removal from the basic part 3 is indicated by means of a straight arrow.

Figure 4:
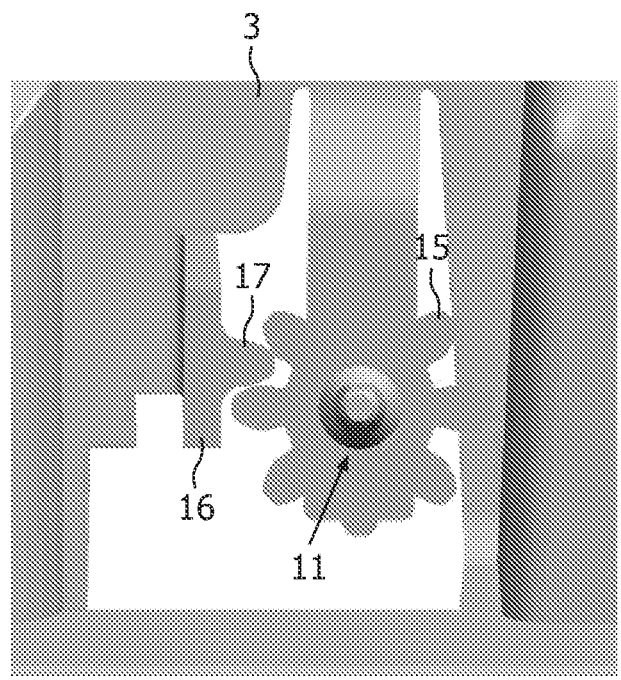
Figure 5:
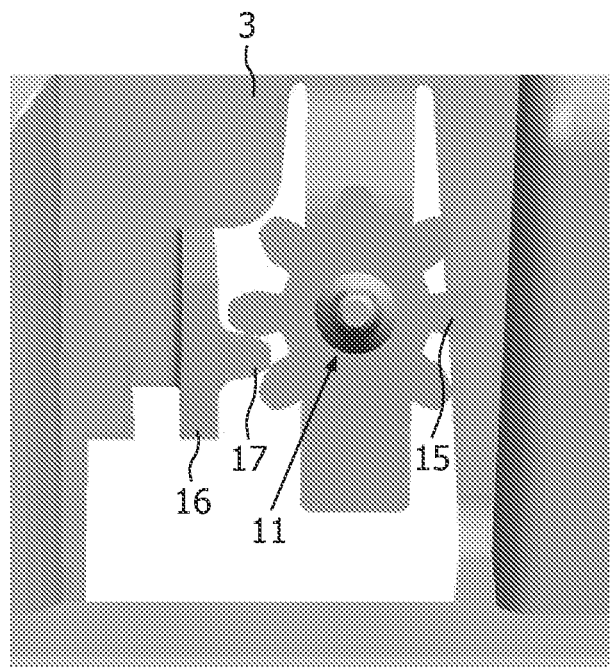

In the initial position as shown in FIG. 3, there is no contact between the gear 15 of the pin 11 and the tooth 17 of the basic part 3. However, when the milk frothing unit 2 is moved further in the direction as indicated, contact as mentioned is automatically established, as is illustrated by FIG. 4. On the basis of an ongoing movement of the milk frothing unit 2, a moving engagement of the gear 15 and the tooth 17 is realized, wherein the pin 11 is only allowed to move further when being rotated at the same time. The direction of rotation is indicated by means of a bent arrow in FIG. 6. FIG. 5 shows a position of the pin 11 in which rotation with respect to the position as shown in FIG. 4 has taken place. As the pin 11 is moved further, the pin 11 moves beyond the tooth 17, wherein it is no longer possible for teeth of the gear 15 to contact the tooth 17. As soon as the contact between the gear 15 and the tooth 17 is lost, the rotation of the pin 11 stops.

Preferably, the toothed rack 16 is connected to the base part 3 in a non-rigid way, so that in a situation in which the pin 11 is pressed in or taken out hard, the rack 16 may bend away, thereby avoiding damage.

Within the scope of the present invention, other mechanisms for automatically causing a rotation of the pin 11 every time the milk frothing unit 2 is removed from the basic part 3 or put in an operational position in the basic part 3 are feasible. An advantage of the mechanism as described in the foregoing is that it is easy to realize, does not require much space, and is adapted to cause rotation in both situations of removal of the milk frothing unit 2 and placement of the milk frothing unit 2, which is often enough for ensuring that blockage of the air restriction by milk-gel does not occur, as the milk frothing unit 2 needs to be displaced regularly for filling and/or cleaning purposes. Furthermore, by choosing an appropriate number of teeth of the gear 15 and the toothed rack 16, any desired angle of rotation of the pin 11 may be realized.

It is noted that if so desired, a user of the beverage maker 1 may rotate the pin 11 manually when the milk unit 2 has been removed from the beverage maker 1, provided that the pin head 12 is accessible in that situation. In that case, the user may easily rotate the pin 11 by taking hold of the pin head 12. For the purpose of showing the user a direction of rotation, a bent arrow may be depicted on top of the pin head 12, as shown in FIG. 2. The user may also decide to temporarily remove the pin 11 from the milk unit 2 for the purpose of cleaning the hole of the air restriction.

It will be clear to a person skilled in the art that the scope of the present invention is not limited to the examples discussed in the foregoing, but that several amendments and modifications thereof are possible without deviating from the scope of the present invention as defined in the attached claims. While the present invention has been illustrated and described in detail in the figures and the description, such illustration and description are to be considered illustrative or exemplary only, and not restrictive. The present invention is not limited to the disclosed embodiments.
Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the present invention.

In the foregoing, a device 1 for performing a process of treating a liquid such as milk during which air is supplied to the liquid has been described. The device 1 comprises a detachably arranged liquid treating unit 2 and a basic part 3 which is suitable for receiving and accommodating the liquid treating unit 2. The liquid treating unit 2 has an air restriction for taking in air to be used in the liquid treating processes, wherein the air restriction comprises a pin 11 and a hole for receiving the pin 11. In particular, the pin 11 is rotatably arranged in the hole, and means 15, 16, 17 are provided for causing a rotation of the pin 11 in case of a movement of the liquid treating unit 2 in and/or out of the liquid treating device 1. In this way, an automated pin rotation mechanism is realized, whereby any blockage of the air restriction may be destroyed, and a reliable functioning of the air restriction is ensured.

The invention claimed is:

1. A device for performing a process of treating a liquid during which air is supplied to the liquid, the device comprising: a detachably arranged liquid treating unit; a basic part which is suitable for receiving and accommodating the liquid treating unit, wherein the liquid treating unit has an air restriction for letting air into the liquid treating unit during the liquid treating process, wherein the air restriction comprises a pin and a hole for receiving the pin, wherein the pin is rotatably arranged in the hole; and a rotating device comprising at least one element arranged on the basic part and at least one element arranged on the pin, with each adapted to be in moving engagement with each other causing the rotation of the pin within the hole around a longitudinal axis of the pin when the liquid treating unit is moved with respect to the basic part during removal of the liquid treating unit from the basic part and when the liquid treating unit is moved into an operational position in the basic part.

2. The device according to claim 1, wherein the basic part includes a toothed rack, and wherein the pin includes a gear configured for engagement with the toothed rack.

3. The device according to claim 2, wherein the toothed rack comprises only a single tooth.

4. The device according to claim 1, wherein the pin has a substantially circular cross section having a circumference with at least one flattened portion.

5. The device according to claim 1, wherein the liquid treating unit further comprises a container configured to contain a quantity of liquid.

6. The device according to claim 1, wherein the basic part is configured to brew a beverage combined with the liquid.

7. A device for performing a process of treating a liquid during which air is supplied to the liquid, the device comprising:
a detachably arranged liquid treating unit including an air restriction configured to let air into the liquid treating unit during the liquid treating process, the air restriction including a hole and a pin rotatably arranged in the hole;
a body configured to receive and accommodate the liquid treating unit; and
a rotating device comprising at east one element arranged on the body and at least one element arranged on the pin, with each adapted to be in moving engagement with each other causing the rotation of the pin within the hole around a longitudinal axis of the pin when the liquid treating unit is moved with respect to the body during removal of the liquid treating unit from the basic part and when the liquid treating unit is moved into an operational position in the body.

8. The device according to claim 7, wherein the body includes a toothed rack, and wherein the pin includes a gear configured for engagement with the toothed rack.

9. The device according to claim 8, wherein the toothed rack comprises only a single tooth.

10. The device according to claim 7, wherein the pin has a substantially circular cross section having a circumference with at least one flattened portion.

11. The device according to claim 7, wherein the liquid treating unit further comprises a container configured to contain a quantity of liquid.

12. The device according to claim 7, wherein the body is configured to brew a beverage combined with the liquid.

* * * * *